US011595490B2

(12) United States Patent
Peng et al.

(10) Patent No.: US 11,595,490 B2
(45) Date of Patent: Feb. 28, 2023

(54) METHODS AND SYSTEMS FOR IMPLEMENTING A FUNCTION FOR AN APPLICATION USING A MIDDLEWARE

(71) Applicants: UBTECH NORTH AMERICA RESEARCH AND DEVELOPMENT CENTER CORP, Pasadena, CA (US); UBTECH ROBOTICS CORP LTD, Guangdong (CN)

(72) Inventors: Kang-Hao Peng, Pasadena, CA (US); Dejun Guo, San Gabriel, CA (US); Huan Tan, San Gabriel, CA (US)

(73) Assignee: UBKANG (QINGDAO) TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/230,762

(22) Filed: Apr. 14, 2021

(65) Prior Publication Data

US 2022/0337669 A1    Oct. 20, 2022

(51) Int. Cl.
*H04L 67/55* (2022.01)
*H04L 9/40* (2022.01)
*H04L 67/00* (2022.01)
*H04L 67/025* (2022.01)

(52) U.S. Cl.
CPC ............ *H04L 67/55* (2022.05); *H04L 63/166* (2013.01); *H04L 67/025* (2013.01); *H04L 67/34* (2013.01)

(58) Field of Classification Search
None
See application file for complete search history.

(56) References Cited

U.S. PATENT DOCUMENTS

| 6,405,145 B1 * | 6/2002 | Rust ....................... G06F 9/455 702/121 |
| 10,715,315 B1 | 7/2020 | Proctor et al. |

(Continued)

FOREIGN PATENT DOCUMENTS

| CN | 201294003 Y | 8/2009 |
| CN | 202218271 U | 5/2012 |

(Continued)

OTHER PUBLICATIONS

Jason M O'Kane, "A Gentle Introduction to ROS" Apr. 2018, University of South Carolina (Year: 2018).*

(Continued)

*Primary Examiner* — Glenford J Madamba
*Assistant Examiner* — Abderrahmen Chouat
(74) *Attorney, Agent, or Firm* — Bayes PLLC

(57) ABSTRACT

Embodiments of the disclosure provide methods and systems for implementing a function for an application using a middleware on a computer. An exemplary method may include initializing an application node in the middleware corresponding to the application, the initializing comprising binding the function to the application node and associating the application node with a cryptor, connecting the middleware to a remote device through a transport layer using the cryptor, publishing a message to invoke the function from the application node, through the middleware, to the cryptor, and communicating with the remote device to invoke the function, using the cryptor, based on the message.

18 Claims, 15 Drawing Sheets

(56) References Cited

U.S. PATENT DOCUMENTS

| | | | |
|---|---|---|---|
| 2004/0128622 A1* | 7/2004 | Mountain | G06Q 30/02 |
| | | | 715/234 |
| 2005/0055322 A1* | 3/2005 | Masters | H04L 67/1001 |
| 2005/0102500 A1 | 5/2005 | Khangaonkar et al. | |
| 2007/0150104 A1* | 6/2007 | Jang | G05D 1/028 |
| | | | 700/245 |
| 2008/0215883 A1* | 9/2008 | Fok | H04W 12/06 |
| | | | 713/167 |
| 2019/0044939 A1* | 2/2019 | Smith | G06F 21/53 |
| 2021/0160315 A1* | 5/2021 | Linn-Moran | H04L 67/562 |
| 2022/0103517 A1* | 3/2022 | Luotojärvi | H04L 63/029 |

FOREIGN PATENT DOCUMENTS

| | | |
|---|---|---|
| CN | 202309767 U | 7/2012 |
| CN | 103197928 A | 7/2013 |

OTHER PUBLICATIONS

A. Elkady and T. Sobh. Robotics middleware: A comprehensive literature and attribute-based bibliography. Journal of Robotics, Hindawi Publishing Corporation, vol. 2012, Article ID 959013 (16 pages).

D. Bakken. Middleware. Encyclopedia of Distributed Computing, J. Urban and P. Dasgupta, Eds., Kluwer Academic, Dodrecht, The Netherlands, 2001 (5 pages).

Morgan Quigley, Ken Conley, Brian P. Gerkey, Josh Faust, Tully Foote, Jeremy Leibs, Rob Wheeler, and Andrew Y. Ng Ros: an open-source robot operating system. In ICRA Workshop on Open Source Software, 2009 (6 pages).

Open Source Robotics Foundation, Inc. et al. Ros 2. Available online at: http://design.ros2.org/articles/why_ros2.html (4 pages).

Open Source Robotics Foundation, Inc. et al. Robotic operating system. Available online at: htttps://www.ros.org (2 pages).

Open Source Robotics Foundation, Inc. et al. Robotic operating system. Available online at: http://wiki.ros.org/ROS/Concepts (7 pages).

Open Source Robotics Foundation, Inc. et al. Robotic operating system. Available online at: http://wiki.ros.org/roscpp/Internals (8 pages).

Open Source Robotics Foundation, Inc. et al. Ros 2. Available online at: http://design.ros2.org/articles/changes.html (7 pages).

Hugo Vieira da Silva. The need for speed—experimenting with message serialization. Available online at: https://medium.com/@hugovs/the-need-for-speed-experimenting-with-message-serialization-93d7562b16e4 (13 pages).

International Search Report and Written Opinion in related PCT Application No. PCT/CN2022/083052 dated Jun. 8, 2022 (8 pages).

* cited by examiner

METHODS AND SYSTEMS FOR IMPLEMENTING A FUNCTION FOR AN APPLICATION USING A MIDDLEWARE

TECHNICAL FIELD

The present disclosure relates to methods and systems for implementing a function for an application using a middleware, and more specifically, relates to methods and systems for using the middleware to facilitate message exchange for an application by establishing a corresponding application node, and publishing messages through nodes in the middleware to cryptors, which use a transport layer to invoke the function and share information for the function.

BACKGROUND

Middleware, or a message exchange system, is an abstraction layer that resides between an operating system and distributed software applications. Some goals of a middleware's design are to manage the heterogeneity of the hardware and network interfaces, improve software application quality, and simplify software architecture to reduce development costs. Because the inputs and outputs of such a system are fixed, developers only need to build the algorithms of their own applications rather than modifying the whole system, therefore version controllability is also increased. In addition, programming abstractions offered by middleware can provide transparency with respect to applications' distribution in location, concurrency, replication, failures, and mobility, thus enabling features that individual packages cannot provide.

As an example of robotic middleware, Robot Operating System (ROS) is an open-source message exchange system that is suitable for fast prototyping but not for production. ROS is popularly used as it is compatible across Linux® and Windows®, and it supports multiple programming languages such as C/C++, Python®, Octave and Lisp. ROS also provides tools, libraries, and conventions so that ROS has a huge user community. Many useful simulators, visualizers (Gazebo, RViz, rqt_plot, etc.), and open-source packages (e.g., navigation, canopen_master, rosserial, rosbridge_suite, MoveIt!, etc.) have already been integrated into ROS.

However, ROS has its limitations. For example, ROS offers no security protection over eavesdropping or adversarial attack. Anyone who has installed ROS can monitor internal messages or even feed fake messages into the system. Also, ROS is not designed for real-time message exchange. Additionally, ROS is also unstable because its configurations and services are based on XMLRPC and its transmissions are mainly based on transmission control protocol (TCP). The above aspects are problematic when using ROS.

SUMMARY

Embodiments of the disclosure provide a method for implementing a function for an application using a middleware on a computer. An exemplary method may include initializing an application node in the middleware corresponding to the application, the initializing including binding the function to the application node and associating the application node with a cryptor. The method may also include connecting the middleware to a remote device through a transport layer using the cryptor. The method may further include publishing a message to invoke the function from the application node, through the middleware, to the cryptor. The method may additionally include communicating with the remote device to invoke the function, using the cryptor, based on the message.

Embodiments of the disclosure also provide a system for implementing a function for an application using a middleware on a computer. Such an exemplary system may include at least one processor, and a memory storing instructions that, when executed by the at least one processor, cause the processor to initialize an application node in the middleware corresponding to the application by binding the function to the application node and associating the application node with a cryptor. The at least one processor may also connect the middleware to a remote device through a transport layer using the cryptor. The at least one processor may further publish a message to invoke the function from the application node, through the middleware, to the cryptor. The at least one processor may additionally communicate with the remote device to invoke the function, using the cryptor, based on the message.

Embodiments of the disclosure further provide a non-transitory computer-readable medium storing instructions that, when executed by at least one processor, cause the at least one processor to perform a method for implementing a function for an application using a middleware on a computer. Such an exemplary method may include initializing an application node in the middleware corresponding to the application, the initializing including binding the function to the application node and associating the application node with a cryptor. The method may also include connecting the middleware to a remote device through a transport layer using the cryptor. The method may further include publishing a message to invoke the function from the application node, through the middleware, to the cryptor. The method may additionally include communicating with the remote device to invoke the function, using the cryptor, based on the message.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Embodiments of the present disclosure will be described with reference to the accompanying drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As discussed above, it would be beneficial to have a more secure, stable, and real-time message exchange system to replace ROS.

Embodiments of the disclosure address the above problems by providing methods and systems using in implementing a function for an application using a middleware by using a middleware that is constructed in a manner that provides a secure, stable, and real-time message exchange system.

Figure 1:
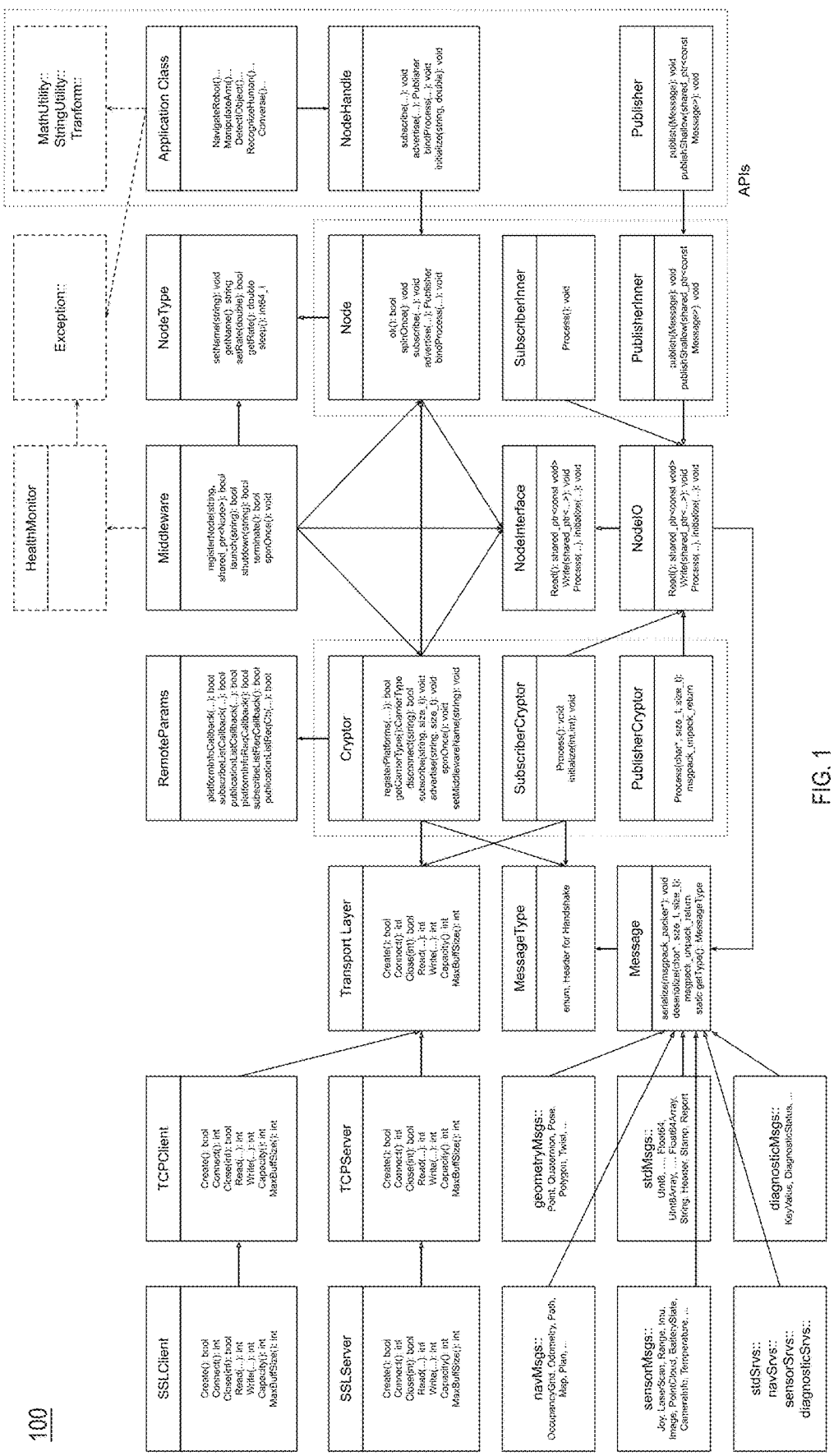
FIG. 1 illustrates a schematic diagram of an exemplary middleware, according to embodiments of the disclosure.

FIG. 1 illustrates a schematic diagram of an exemplary middleware, according to embodiments of the disclosure. As noted above, the exemplary middleware is provided as an alternative middleware to replace Robot Operating System (ROS).

The middleware includes transport layers, messages, node input/outputs, nodes, cryptors, and additional elements. These constituents are defined in greater detail in FIGS. 5-10, below. However, FIG. 1 shows the basic constituents of these portions of the middleware, including the functions defined at the portions. For example, the transport layer 500 elements include SSLClient 510, TCPClient 520, SSLServer 530, TCPServer 540, and TransportLayer 550. The message 600 elements include Message 610, navMsgs 620, sensorMsgs 630, diagnosticMsgs 640, geometryMsgs 650, stdMsgs 660, and MessageType 670. The cryptor 700 elements include Cryptor 710, SubscriberCryptor 720, PublisherCryptor 730, and RemoteParams 740. The node IO 800 elements include NodeInterface 810, NodeIO 820, SubscriberInner 830, PublisherInner 840, and Publisher 850. The node elements 900 include Middleware 910, NodeType 920, Node 930, and NodeHandle 940. Other features 1000 include Application Class 1010, HealthMonitor 1020, Exception 1030, MathUtility 1040, StringUtility 1050, and Transform 1060. These constituent parts of the middleware interact with one another in specific ways to facilitate the transmission of messages through an infrastructure.

For a basic system build environment, minimally the middleware is designed to run on Ubuntu® 18.04, and other implementations extend the OS support to Ubuntu® 16.04 and MacOS®, as non-limiting examples. For programming languages, the middleware supports C++ 11, as an example, because it is fast. Script languages such as Python® or Ruby usually do not meet the real time requirement. Using scripting languages can cause a security leak because every line of code is visible, which may be minimized by further compiling script code into binaries.

For a system architecture, the middleware spawns one thread per node to maximally utilize computational resources. In addition, the middleware adopts a central master broker to shallowly relay message, in one embodiment. This embodiment may be vulnerable to single point failure, but the disclosed middleware can avoid this issue by adapting a data distribution service (DDS) framework/concept, as an alternative. For open-source packages, generally the middleware avoids using them because it is difficult to guarantee that their coding quality and security level will meet product requirements. That being said, if enough research has been done prior to using these open-source libraries, then the middleware can depend on them, as long as they are ROS independent.

For example, for hardware drivers, simulators, and visualizers, the middleware can either call its software development kit (SDK) or application programming interface (API) as a third-party library, or the middleware allows nodes that only have limited ROS access and uses a middleware-ROS bridge to achieve this goal. In addition, the middleware should provide some common robot-specific mathematical or string processing utility functions, which are discussed further in connection with FIG. 10, below.

For robustness, the middleware may include a health monitor as a failsafe feature so middleware can dynamically respawn a node whenever it fails. Middleware should also capture those failure exceptions and report the exceptions to a std::exception channel. These features are also discussed further in connection with FIG. 10, below.

As alternatives, the middleware could support the data distribution standard (DDS) as provided by Object Management Group (OMG). For example, instead of adopting a star-architecture using a central master broker overlay, a distributed node discovery mechanism under a subscription/publication paradigm with various quality-of-service (QoS) measurements would be even more beneficial. Moreover, for remote transmissions that have real-time requirement (for example, control streaming for robotic arm manipulation and audio/video streaming), middleware should also support a time-sensitive networking (TSN) standard (IEEE 802.1Q) to ensure very low transmission latency and high availability.

Figure 2:
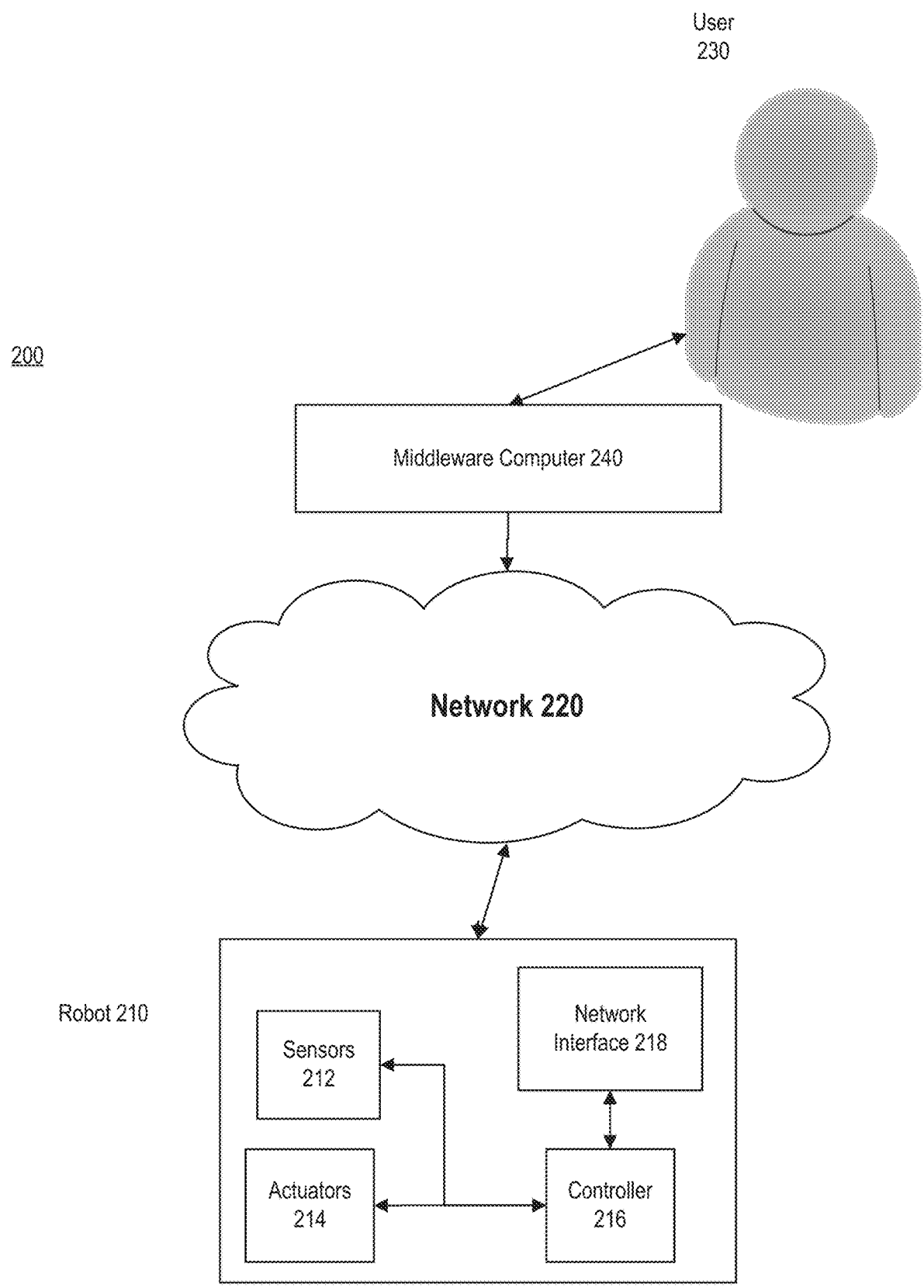
FIG. 2 illustrates an example of a robot being controlled over a network, according to embodiments of the disclosure.

FIG. 2 illustrates an example of a robot being controlled over a network, according to embodiments of the disclosure. For example, FIG. 2 illustrates an exemplary system architecture 200 for using a middleware to control a robot, according to embodiments of the disclosure.

As shown in FIG. 2, the system architecture 200 may include a robot 210, a network 220, a user 230, and a middleware computer 240. The robot 210 may be able to implement various functions for the user 230. The user 230 interacts with the middleware computer 240, such that information is sent between the robot 210 and the middleware computer 240 on behalf of the user 230 via network 220. To facilitate interaction between the robot 210 and the user 230, middleware may be hosted by the middleware computer 240, as discussed further below.

The network 220 is used for providing a medium for the communication link between the robot 210 and the middleware computer 240, which interacts with the user 230 to empower the user 230 to control the robot 210. The network 220 can include various connection types, for example, a wired or wireless communication link or an optical fiber cable.

The user 230 may desire that the robot 210 provide various services. For example, a user may wish that the robot would perform some actions, or that the robot provide data to the user. Using a middleware computer 240 as described below provides an improved way for the user 230 to manage exchanging information with the robot 210, such as by providing the robot 210 with instructions or by receiving information produced by the robot 210.

For example, the robot 210 may be equipped with sensors 212 and actuators 214, and a controller 216. The robot 210 may also include a network interface 218 that the robot uses to interface with the network 220, where the network 220 interfaces with a middleware computer 240 that facilitates passing function calls, function parameters, and function return values over the network 220 on behalf of the user 230 to allow the user 230 to better interact with robot 210. In particular, the middleware hosted by middleware computer 240 makes it easier for user 230 to program robot 210.

The sensors 212 and actuators 214 may transmit the collected information to the controller 216 via various communication manners (for example, a wired or wireless communication link or an optical fiber cable). The sensors 212 may be various electronic devices for collecting the surrounding environment information, including but not limited to cameras and radars, as non-limiting examples. The environmental information may be visual or audible information, but it will be readily recognized by one of ordinary skill that many other examples of sensors 212 are possible. The actuators 214 may be various electronic devices for causing the robot 210 to take physical actions to manipulate the environment, such as activating an electric motor to move a portion of the robot 210, but it will be readily recognized by one of ordinary skill that many other examples of sensors 212 are possible.

The controller 216 adopts a robot operating system, such as an operating system designed to interact with the middleware, and converts the surrounding environment information collected by the sensors 212 and the instructions provided by the user 230 to be sent via the network interface 218 and the middleware computer 240 through the network 220 into control information for the actuators 214 under the management of the middleware computer 240 and the controller 216, so that the robot 210 can interact with the user 230 in a facilitated manner.

The controller 216 may also manage sending information from the sensors 212 to the user 230. Such a controller 216 may include a processor and a memory with instructions to operate the robot 210 using software, or it may have hard-coded instructions that cause the controller 216 to operate the robot 210 in a predefined manner.

It should be understood that the number of the robots 210 and the users 230 in FIG. 2 are merely arbitrary. There may be any number of the robots 210 and the users 230, as suitable in practice for an example.

Figure 3:
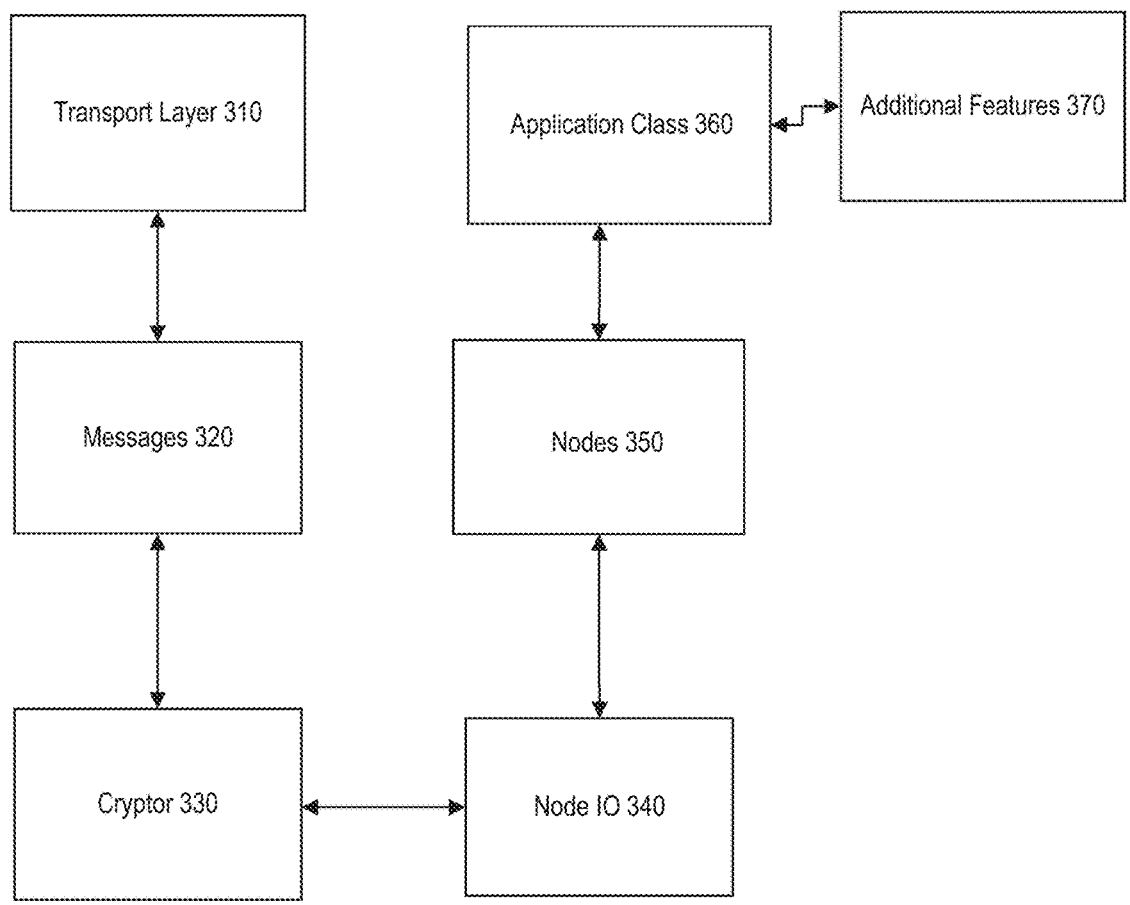
FIG. 3 illustrates a block diagram of a robot controller middleware architecture, according to embodiments of the disclosure.

FIG. 3 illustrates a block diagram of a robot controller middleware architecture 300 (thereafter referred to as "middleware 300"), according to embodiments of the disclosure. FIG. 3 shows the interactions between transport layer 310, messages 320, cryptor 330, node IO 340, nodes 350, application class 360, and additional features 370. These aspects of the middleware 300 have been discussed to some degree with respect to FIG. 1, above. However, the overall interactions of these constituent parts of the middleware are described with respect to FIG. 3. The transport layer 310 is responsible for end-to-end communication over network 220. In the middleware 300, the transport layer 310 provides the ability to transmit (write) a string to a remote or receive (read) a string from a remote, as discussed further below. The middleware 300 is able to change the information that enters into or emanates from transport layer 310 into a message 320, providing the capability to pass the message 320 through the middleware 300.

Specifically, the message 320 is conveyed by the middleware 300 into a cryptor 330. A cryptor 330 is a special kind of node, discussed further, below. The cryptor 330 is designed to manage messages 320 that are sent into or received from transport layer 310. Once the cryptor 330 receives a message 320 from the transport layer 310, it uses node IO 340 to share the message with other nodes 350, which are designed to interact with an application class 360 that provides a template of a way for a user 230 to interact with the middleware 300. The middleware 300 may also provide additional features 370 that extend the capabilities of middleware 300 by providing additional capabilities when managing application execution.

Figure 5:
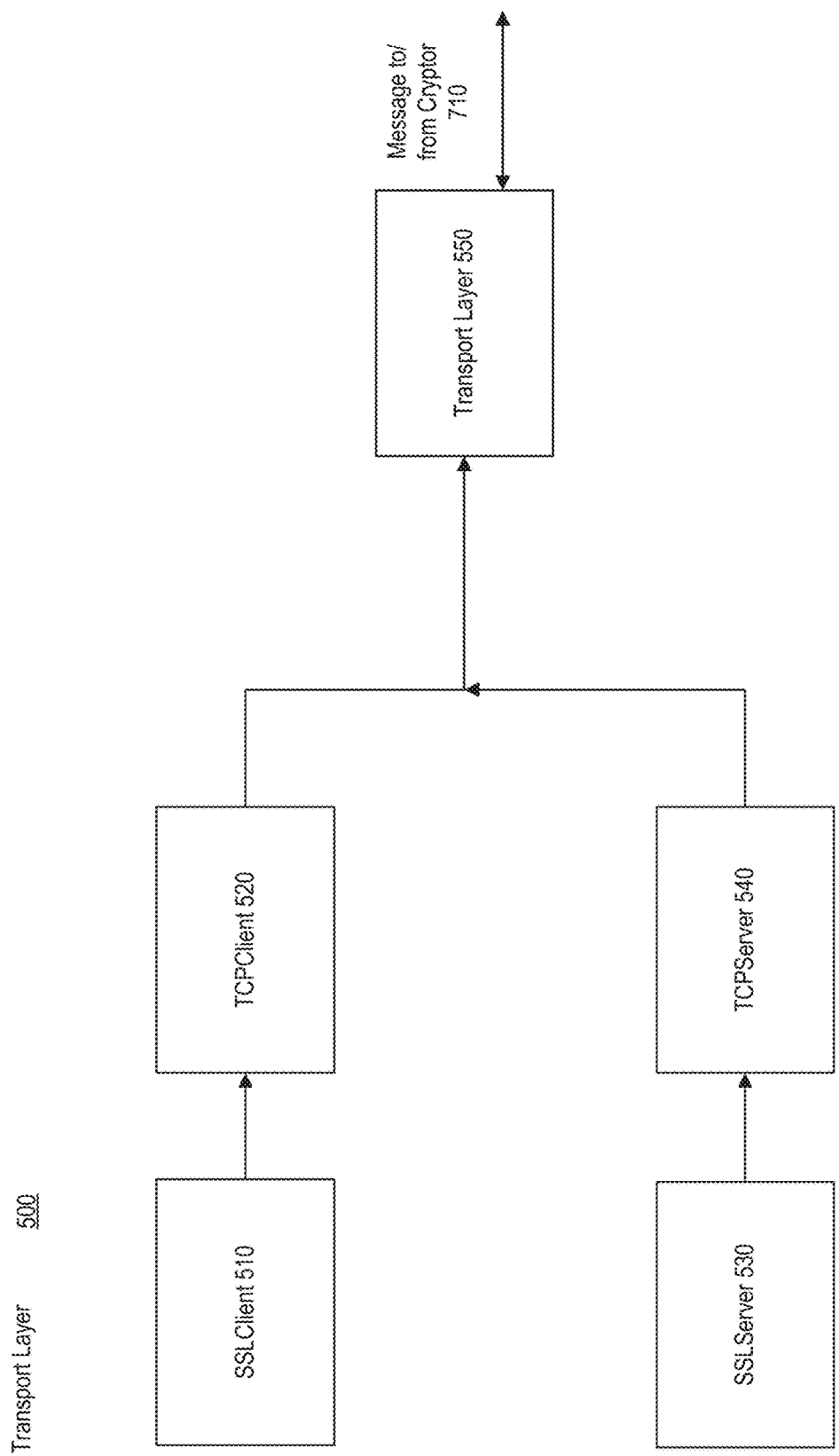
FIG. 5 illustrates a block diagram of a transport layer, according to embodiments of the disclosure.

Further details of transport layer 310 shown in FIG. 3 are presented in FIG. 5. Further details of messages 320 are presented in FIG. 6. Further details of cryptors 330 are presented in FIG. 7. Further details of node IO 340 are presented in FIG. 8. Further details of nodes 350 are presented in FIG. 9. Further details of application class 360 are presented in FIG. 10. Further details of additional features 370 are also presented in FIG. 10.

Figure 4:
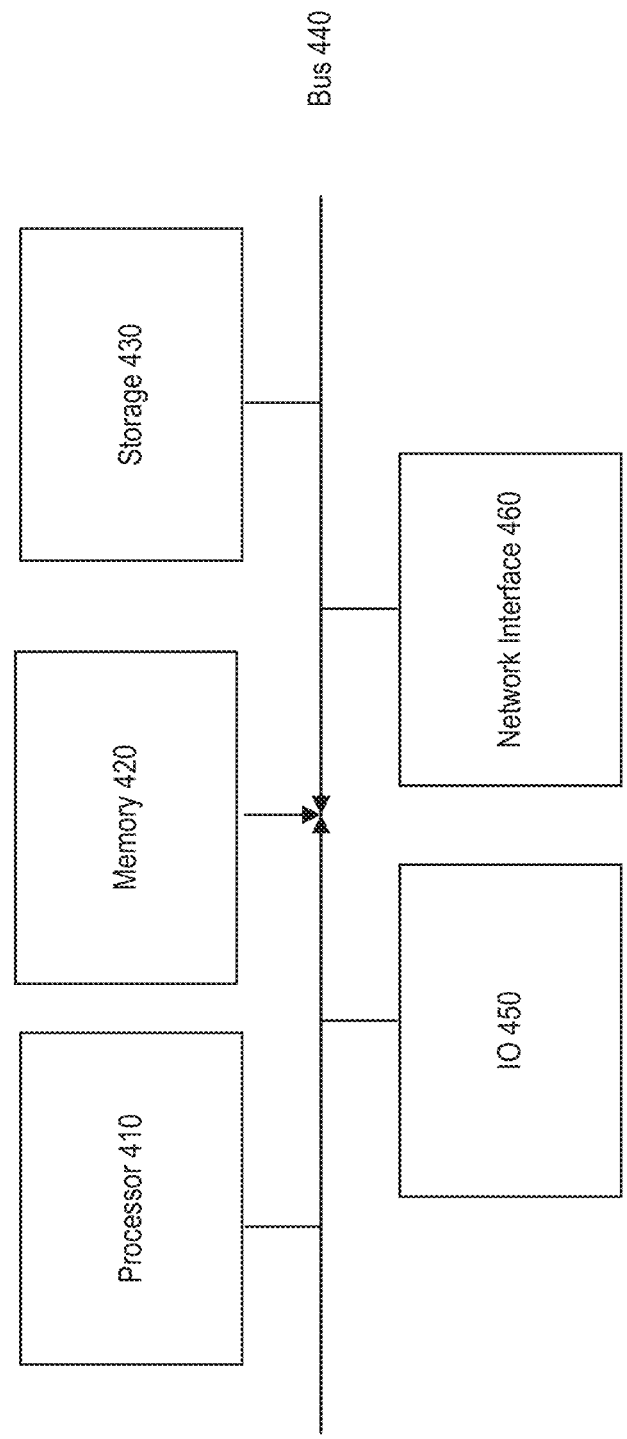
FIG. 4 illustrates a block diagram of a computer system for hosting a middleware computer, according to embodiments of the disclosure.

FIG. 4 illustrates a block diagram of a computer system that may host a middleware, according to embodiments of the disclosure. Referring to FIG. 4, a schematic structural diagram of a computer system 400 adapted to implement a middleware computer, according to one or more embodiments is shown. For example, computer system 400 may serve as an implementation of middleware computer 240.

As shown in FIG. 4, the computer system 400 includes a processor 410, which may execute various appropriate actions and processes in accordance with a program stored in a memory 420, where the memory 420 is a read-only memory (ROM) or a program loaded into memory 420, where the memory 420 is a random-access memory (RAM), from a storage 430. The memory 420 and storage 430 also store various programs and data required by operations of the computer system 400. The processor 410, the memory 420, and the storage 430 are connected to each other through a bus 440. Inputs/Outputs (IO) 450 and network in 460 are also connected to the bus 440.

As shown in FIG. 4, computer system 400 may include processor 410. Although only one processor is shown, it is understood that multiple processors can be included. Processor 410 may include microprocessors, microcontrollers, digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 410 may be a hardware device having one or more processing cores. Processor 410 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code, though as noted above, there may be certain issues with using an interpreted language. Other techniques for instructing hardware are also permitted under the broad category of software.

As shown in FIG. 4, computer system 400 may also include memory 420 and storage 430. Although only one memory is shown, it is understood that multiple memories can be included. Memory 420 generally refers to working memory used to interact with processor 410, while storage 430 refers to hardware for the long-term maintenance of data. For example, memory 420 may include random-access memory (RAM), read-only memory (ROM), static RAM (SRAM), dynamic RAM (DRAM), and/or ferro-electric RAM (FRAM), while storage 430 may include electrically erasable programmable ROM (EEPROM), CD-ROM or other optical disk storage, hard disk drive (HDD), such as magnetic disk storage or other magnetic storage devices, a Flash drive, a solid-state drive (SSD), and/or any other medium that can be used to carry or store desired program code in the form of instructions that can be accessed and executed by processor 410. Broadly, memory 420 may be embodied as any computer-readable medium suitable for storing information for processor 410, and storage 430 may be embodied as any non-volatile computer-readable medium, such as a non-transitory computer-readable medium.

Additionally, the computer system 400 may include input/output (IO) 450 elements. For example, all or some of a keyboard, a mouse, a microphone, a camera, a touchscreen, and so on may be connected as inputs to IO 450. However, these are only non-limiting examples and other inputs may be used. For example, other inputs may be used that provide information such as visual information, audio information, tactile information, or digital information.

For example, all or some of a monitor or display including a cathode ray tube (CRT), a liquid crystal display device (LCD), a light-emitting diode display device (LED), or another output device, such as a speaker, and so on, may be connected as outputs to IO 450. However, these are only non-limiting examples and other outputs may be used. For example, other outputs may be used that provide information such as visual information, audio information, tactile information, or digital information, or produce outputs such as two-dimensional (2-D) or three-dimensional (3-D) printouts.

A network interface 460 includes a network interface card, such as a wireless adapter, an Ethernet adapter, a LAN card, and/or a modem. The network interface 460 performs communication processes via a network 220, such as the Internet, though other types of network such as a local area network (LAN) or a wide area network (WAN). Other types of network architecture such as client-server and peer-to-peer networks may also be used. The network may be based on a wired network, a wireless network, an optical fiber, or any other medium allowing the exchange of information between computing devices.

FIG. 5 illustrates a block diagram of a transport layer 500, according to embodiments of the disclosure.

In an open system interconnection (OSI) model of a computer network, a transport layer is responsible for end-to-end communication over a network. In the middleware 300 disclosed in this disclosure, the transport layer 500 refers to a group of classes labeled as TransportLayer 550 that have the ability to losslessly transmit or write a string to a remote device and receive or read a string from such a remote device. Examples include of protocols that may be used in a transport layer 500 include Transmission Control Protocol (TCP), User Datagram Protocol (UDP), Secure Socket Layer (SSL), and Control Area Network (CAN), as non-limiting examples. However, these are only examples, and other protocols may be used, as long as they can satisfy the transport layer class requirements. To be a TransportLayer 550 class, the following virtual functions should be implemented in a non-blocking manner, such that the implementations satisfy the condition timeout threshold=0, indicated with the function descriptions.

The function bool Create( )=0 instantiates a transport layer object if a system condition allows and returns a flag to indicate if the creation is successful. Object parameters may be configured elsewhere, for example, at the constructor or an init( ) function of the transport layer object.

The function int Connect( )=0 connects a transport layer object to a remote connection, such as a remote device over a network. Because some transport layer implementations allow for multiple remote connections, this function returns the connected remoteIndex (0, 1, . . . ) upon a successful connection, so that system can call int Read/Write( . . . , remoteIndex) later. If there are no new connections pending, or the number of connections reaches capacity, this function returns −1.

The function bool Close(int remoteIndex)=0 closes the connection of the given remote index and returns a flag to indicate if the disconnection is successful. If remoteIndex is −1 when calling this function, then this function closes all of the open connections.

The function int Read(char str[ ], size_t size, size_t remoteIndex)=0 reads the buffer of the transport layer into a string str with length size given remoteIndex and returns the actual number of bytes received. If remoteIndex is invalid, the function returns −2. If there is no message, the function returns −1. If the remote connection or device is disconnected, the function returns 0.

The function int Write(char str[ ], size_t size, size_t clientIndex)=0 sends a string str with a length size given remoteIndex and returns the actual number of bytes received. If remoteIndex is invalid, the function returns −2. If the message cannot be successfully sent, the function returns −1.

The function int Capacity( ) const=0 is a getter function that returns the maximum number of remotes that this transport layer class can connect to.

The function int MaxBuffSize( ) const=0 is a getter function that returns the maximum buffer size that this transport layer class can Read or Write at a time.

For example, in the middleware, the transport layer class supports TCP communications at TCPServer 540 and at TCPClient 520 and SSL communications based on the TCP layer at SSLServer 530 and at SSLClient 510. Additionally, in other examples, it is possible to configure the transport layer class to support, in some usages, UDP and UDPSSL as place holders for time-sensitive networking (TSN) development, such as for real-time applications such as video/audio streaming and robotic arm manipulation control streaming. Also, a control area network (CAN) transceiver is designed for more low-level heterogeneous hardware connections.

Figure 6:
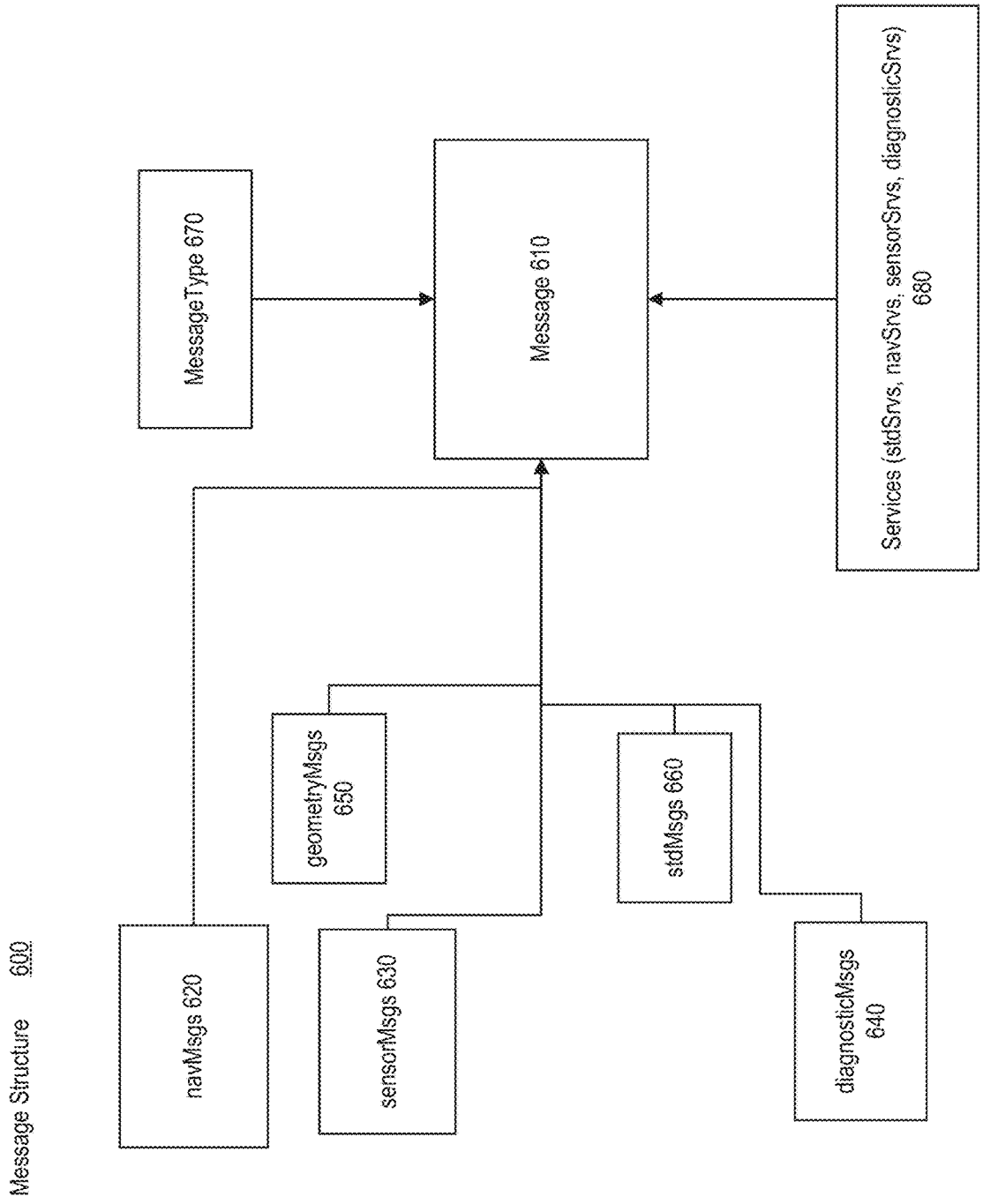
FIG. 6 illustrates a block diagram of elements of a message, according to embodiments of the disclosure.

FIG. 6 illustrates a block diagram of elements of a message, according to embodiments of the disclosure.

In some embodiments, the middleware messages are related to ROS messages. Every ROS message definition corresponds to a middleware message definition. For example, std_msgs::Header and stdMsgs::Header, or geometry_msgs::Pose and geometryMsgs::Pose.

FIG. 6 shows a number of different types of message 610 definitions, including navMsgs 620, sensorMsgs 630, diagnosticMsgs 640, geometryMsgs 650, and stdMsgs 660. Messages are also associated with Services (stdSrvs, navSrvs, sensorSrvs, diagnosticSrvs) 680, and a MessageType 670.

In some embodiments, every message can be assigned a unique MessageType 670 value, which is a C++ enumeration to further facilitate cryptors' handshake process or exception capture. In addition, every middleware message is an extension from a class called Message 610, which defines the virtual functions for serialization, deserialization, and message type retrieval. Regarding to serialization, middleware relies on a third party library msgpack-c to serialize and deserialize message. According to experimental results, this library is four times faster than GOOGLE's protobuf, and provides abstraction for various programming languages such as PYTHON (msgpack-python), JAVA (msgpack-java), and C# (msgpack-cli).

The virtual functions that are defined in Message 610 are as follows, as in an example C++ implementation.

The function void serialize(msgpack_packer*) serializes the message to an initialized msgpack-c packer.

The function msgpack_unpack_return deserialize(char* str, size_t strLen, size_t& offset) deserializes a string str with length strLen based on the automatically maintained variable offset. A Message 610 will be properly initialized after calling this function with a successful unpack flag returned.

The function MessageType getType( ) is a getter function that returns the MessageType 670 assigned for this Message 610.

This design decouples the instantiation of these message classes from actually implementing the serialization and deserialization functions. For example, it is possible to instantiate and publish/subscribe a stdMsgs::Header under a memory-shared paradigm without actually implementing the serialization function of this class. Nonetheless, if this message is transmitted through transport layer, the serialization function will be implemented.

Figure 7:
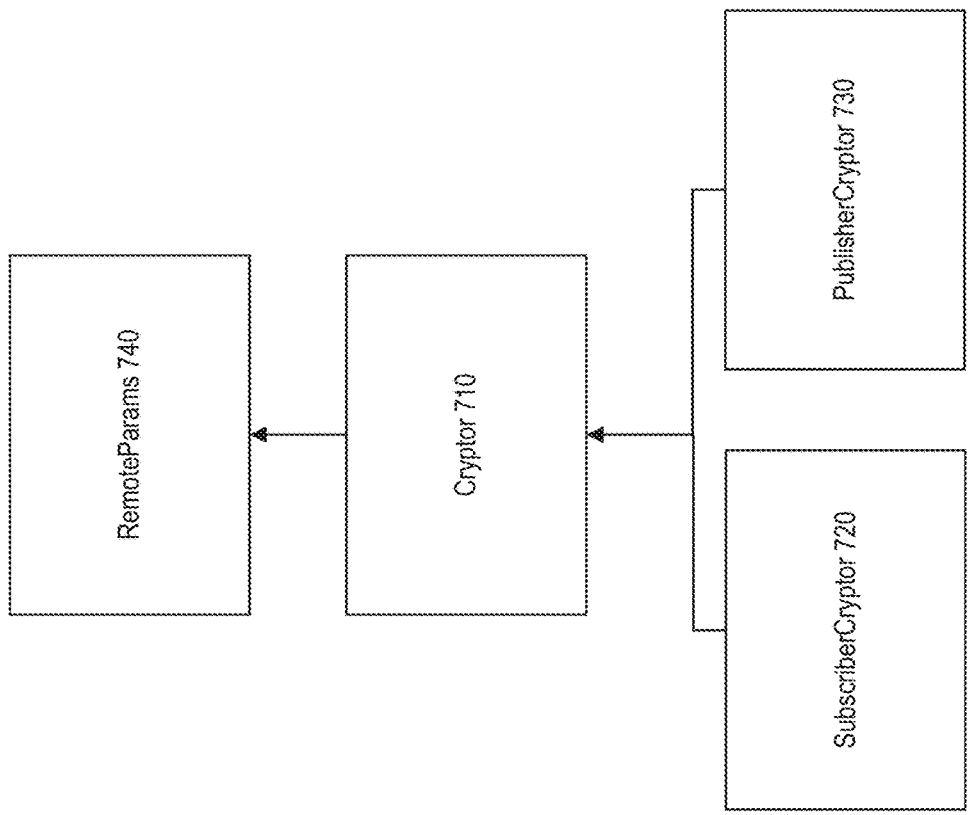
FIG. 7 illustrates a block diagram of elements of a cryptor, according to embodiments of the disclosure.

FIG. 7 illustrates a block diagram of elements of a cryptor, according to embodiments of the disclosure.

A Cryptor 710 is a special Node 930 that automatically serializes messages and sends the serialized string through a transport layer whenever an incoming message is received from SubscriberCryptor 720, and deserializes strings, then publishes the deserialized messages into the middleware system through PublisherCryptor 730, whenever an incoming message string is received from the transport layer. Users may manually call the following functions, with respect to the Cryptor 710. A Cryptor 710 is also associated with RemoteParams 740, where RemoteParams 740 is a special class to contain remote middleware parameters such as name, rate, subscriber list, and publisher list.

The function bool registerPlatforms(vector<string> platforms) registers an array of remote middleware names to be associated with a given Cryptor 710. Upon remote connection of two cryptors, a handshake process will take place, during which the middleware names of the cryptors will be exchanged. If the remote middleware name does not match any locally registered names, then the remote cryptor will break its connection. However, if the handshake is successful and the names match, the cryptors are able to form a connection.

The function CarrierType getCarrierType( ) is a getter function that returns the transport layer type of this Cryptor 710, which can be, as non-limiting examples, TCPServer 540, TCPClient 520, SSLServer 530, and SSLClient 510, as discussed further in FIG. 5.

The function bool disconnect(string platformName) disconnects a remote middleware having the given name, platformName.

The function void subscribe(string topic, size_t qSize) is a type-defined function that is MessageType 670 specific. After calling this function, the cryptor subscribes to the specified topic and automatically serializes it.

The function void advertise(string topic, size_t qSize) is also a type-defined function that is MessageType 670 specific. After calling this function the cryptor publishes to the specified topic whenever messages are received from the transport layer.

The function void setMiddlewareName(string) sets the middleware name this cryptor will use during a remote handshake.

Figure 8:
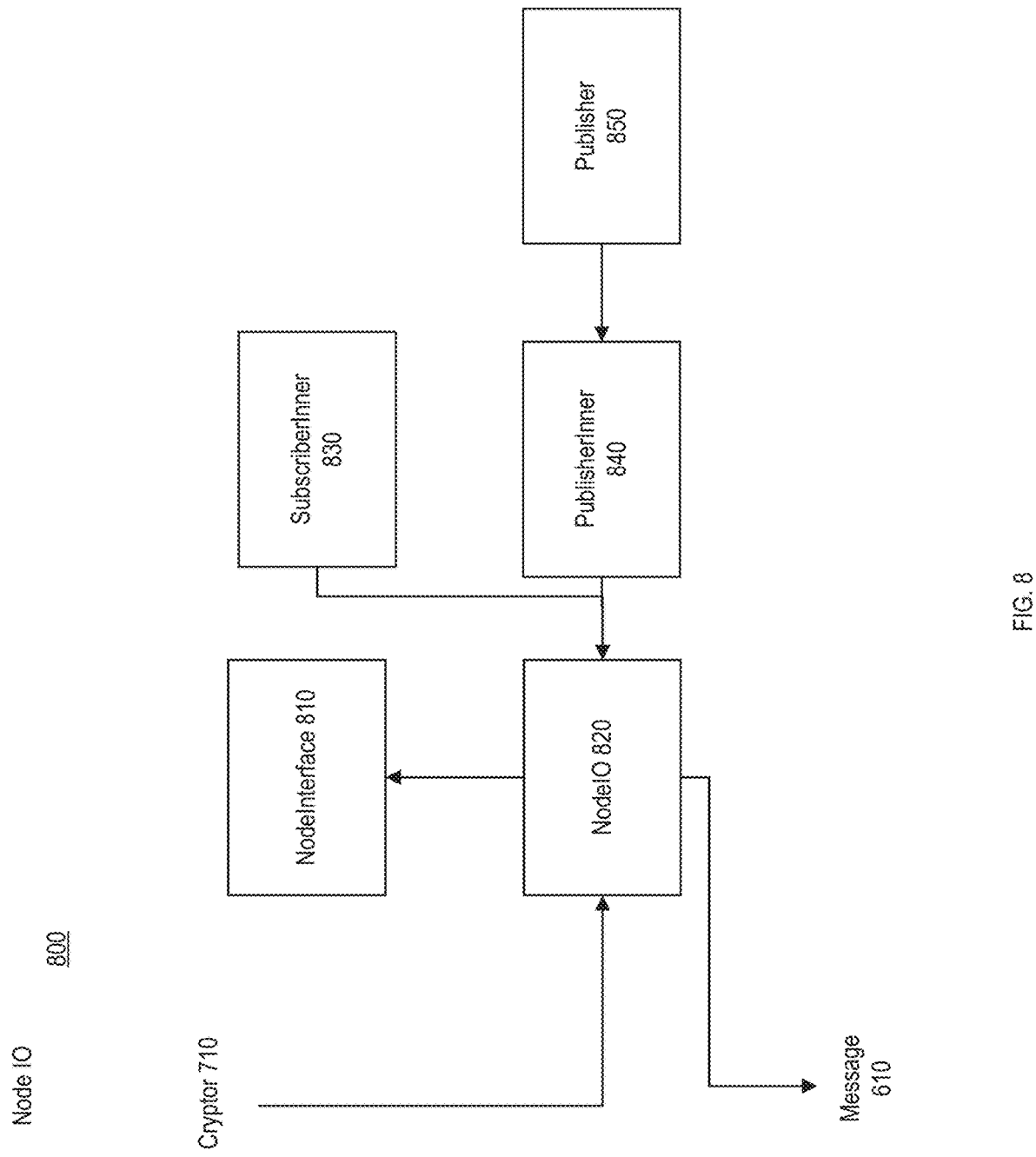
FIG. 8 illustrates a block diagram of elements of node IO, according to embodiments of the disclosure.

FIG. 8 illustrates a block diagram of elements of node IO, according to embodiments of the disclosure.

Node IO (or node interfaces) 800 define a collection of classes that handle various multithreading procedures for a node, such as mutually exclusive (mutex) locking, message shared pointer encapsulation, and message queue processing for application nodes. As long as the quality of these classes is managed successfully (for example, no memory leaks, the classes are fast and stable), the rest of the system can focus on in-thread processing as if each thread is a single thread. A NodeInterface 810 is a message type invariant class that has the following virtual functions defined.

The function std::shared_ptr<const void> Read( )=0 returns the shared pointer of the oldest message inside a message queue. If there is no message inside the queue, this function will return the shared pointer of a nullptr.

The function void Write(const std::shared_ptr<const void>&msg)=0 enqueues a message into the message queue for later processing.

The functions Void Process(•••)=0 and void initialize (•••)=0 are subscriber-specific and publisher-specific functions that will be introduced later.

NodeIO 820, which inherits from NodeInterface 810, is a type-defined MessageType 670 specific class. The message queue and the mutex lock are defined here. For example, SubscriberInner 830, PublisherInner 840, SubscriberCryptor 720, and PublisherCryptor 730 all inherit from NodeIO 820, so they are all, again. MessageType 670 specific. This design allows a node to dynamically specify message types to an internal subscriber/publisher at compile time. Users do not interact with these classes directly. Rather, a user can define a callback function to bind with each subscriber, then the subscriber automatically calls such a callback function whenever a message is received.

A class that user will directly interact with is Publisher 850, which is a shared pointer encapsulated version of PublisherInner 840. Users can use this Publisher 850 class to publish a deep-copied message by calling void publish (Message msg). Alternatively, the user can first manually encapsulate the message into a constant shared pointer, then publish the shallow-copied message pointer by calling void publishShallow(std::shared_ptr<const Message> msgPtr).

Briefly speaking, during development, users will interact with the node IO classes through user-defined callback functions and the publishing functions provided by Publisher. These usages are described in more detail in the paragraphs discussing Node 930 and Cryptor 710 aspects of the middleware.

Figure 9:
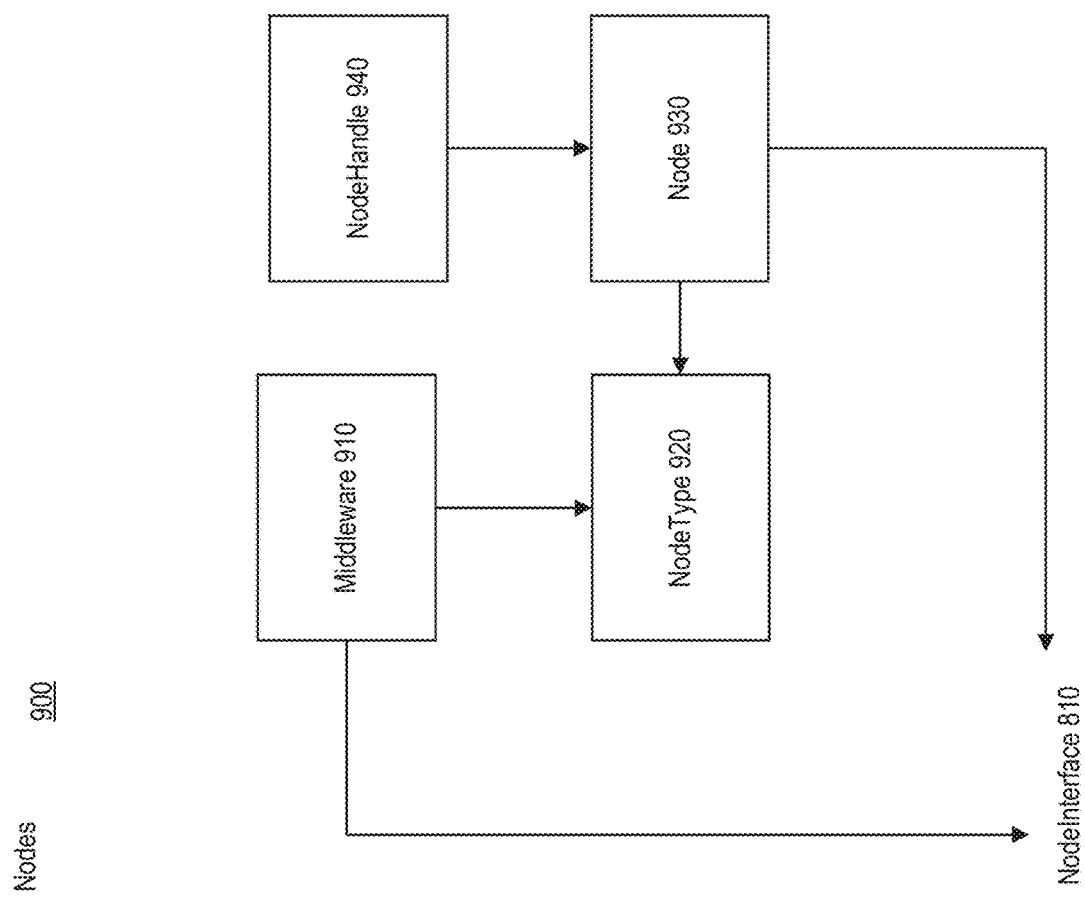
FIG. 9 illustrates a block diagram of elements of nodes, according to embodiments of the disclosure.

FIG. 9 illustrates a block diagram of elements of nodes, according to embodiments of the disclosure.

A Node 930 is the most granular or basic computational unit of middleware. Node 930 inherits from a more fundamental class called NodeType 920, which has the function int64_t sleep( ) implemented, given a rate. Users will most frequently interact with the following functions.

The function void subscribe(const string& topic, size_t qSize, void (NodeName::*callback)(std:: shared_ptr<Message const>&), NodeName* obj) instantiates a SubscriberInner object, and binds the user-defined callback function (where the callback function is to have the input type std::shared_ptr<Message const>& and output type void) to it. Unlike ROS, this function does not return anything to user because the user will interact with the received messages through the callback function. While ROS::NodeHandle::subscribe returns a ROS::subscriber to user, ROS::subscriber is basically useless, and thus the present middleware provides a different, advantageous approach.

The function Publisher<Message> advertise(const string& topic, size_t qSize) instantiates a PublisherInner 840 object, and returns its shared pointer encapsulated version Publisher 850 to user.

The function void bindProcess(void (NodeName::*process)(void), NodeName* obj, FunctionType type) is a distinguishing feature of the present middleware from ROS. Similar to the callback of subscription, bindProcess binds a user defined function pointer (with both input and output being void) for three kinds of FunctionTypes, namely Initialize, Terminate, and Process.

If Initialize( ) is bound, the system will call the bound function pointer after launching the node to properly initialize it. Users can use this feature to open a file stream or preload a dataset.

If Terminate( ) is bound, the system will call the bound function pointer before shutting down the node to properly terminate it. Users can use this feature to close a file stream or release memory.

If Process( ) is bound, the system will call the bound function pointer at the same rate as the node to which it is bound, after all subscribers' callback are called. Users can use this feature to achieve filtering (Kalman filtering, particle filtering, as non-limiting examples), or regulating control, state machine transitioning, publishing topics, and so on, as non-limiting examples.

In addition, Middleware 910 is also a class that inherits from NodeType 920. By default, Middleware 910 may operate at 1000 Hz, as a non-limiting example, but this is only an example default operation rate and other defaults are possible. Alternatively, the user can manually set the Middleware 910 operation rate by calling setRate(double). This Middleware 910 class is a central broker for all the internal message pointer transmissions. Therefore, in each main( ) function only one Middleware 910 object should be declared, and the user may manually call the following functions to prepare and use the Middleware 910.

The function bool registerNode(string nodeName, Node*) registers a user-defined Node 930 into Middleware 910 so it is possible to dynamically launch( ) the node later.

The function bool launch(const string nodeName) starts a thread to contain the node with the given nodeName. If the name has not been registered, launch( ) will return false.

The function bool shutdown(const string nodeName) shuts down and joins the thread that contains the node with the given nodeName. Again, if the name has not been launched, shutdown( ) will return false.

The function bool terminate( ) shuts down every node thread associated with the Middleware 910.

The function void spinOnce( ) traverses through every publisher in Middleware 910 and moves their published messages to corresponding subscribers.

The function void sleep( ) will take the computation time into consideration, and sleeps Middleware 910 to achieve the target rate, accordingly.

NodeHandle 940 is a class that encapsulates Node 930 with a shared pointer. The goal of using NodeHandle 940 is to simplify user APIs. The use of NodeHandle 940 is discussed further in the flowcharts presented in FIGS. 11-15.

Figure 10:
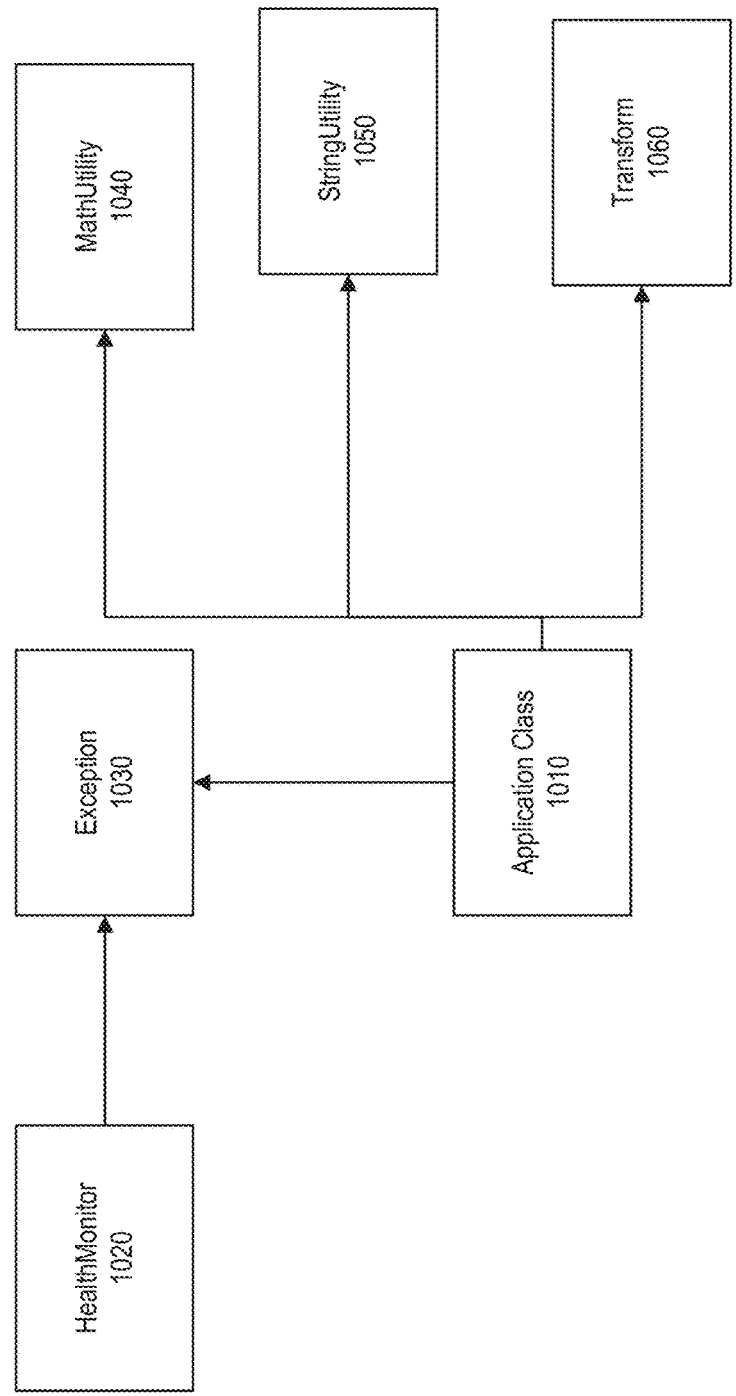
FIG. 10 illustrates a block diagram of elements of other features of the middleware, according to embodiments of the disclosure.

FIG. 10 illustrates a block diagram of elements of other features of the middleware, according to embodiments of the disclosure.

Figure 15:
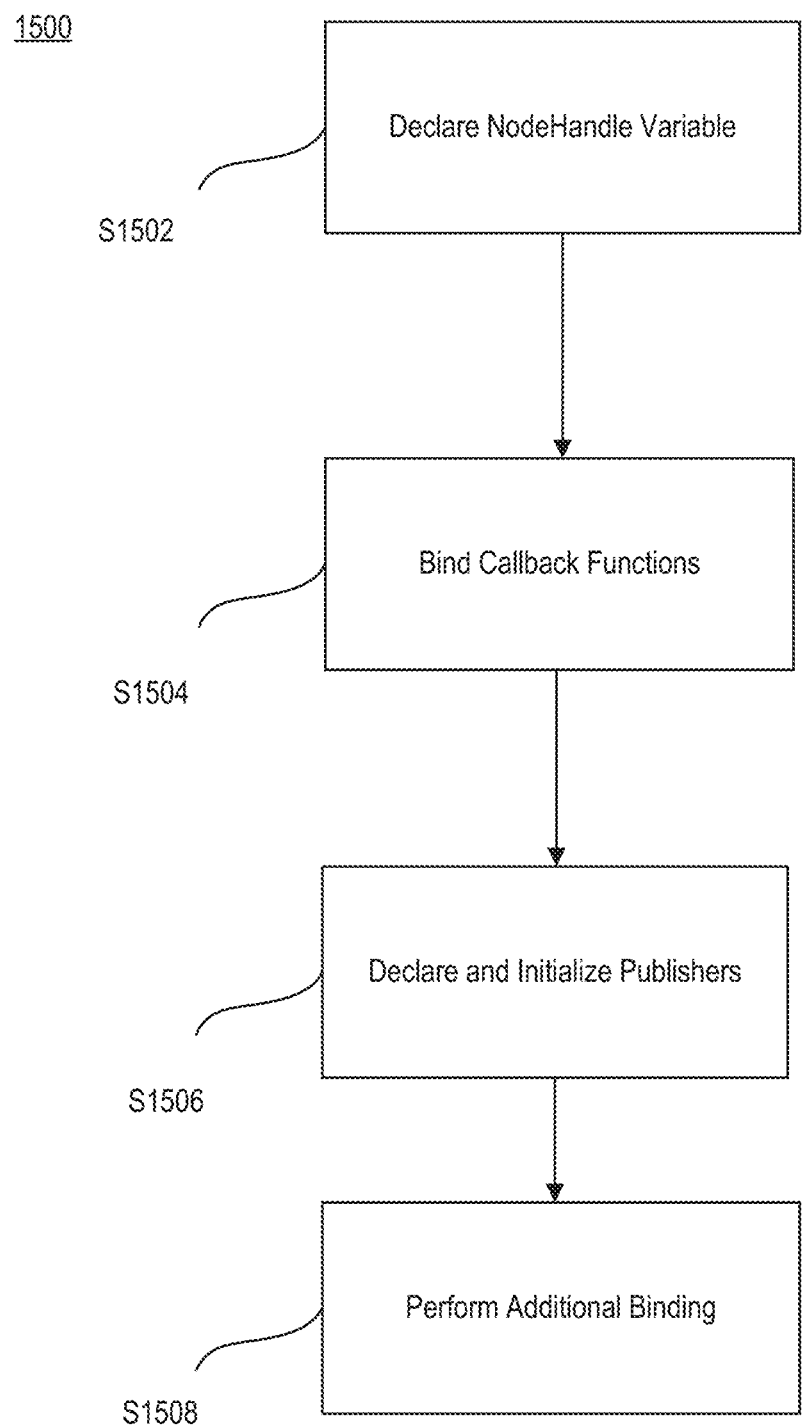
FIG. 15 illustrates a flowchart of an exemplary method for initializing an application node, according to embodiments of the disclosure.

FIG. 10 shows an application class 1010. Such an application class provides a user with a way to establish a middleware and use the middleware to allow an application to invoke function calls. While the application class 1010 is discussed further, below in FIG. 15, FIG. 10 illustrates certain other aspects of the middleware. For example, FIG. 10 shows HealthMonitor 1020, Exception 1030, MathUtility 1040, StringUtility 1050, and Transform 1060.

Here, HealthMonitor 1020 is used to monitor node failure or any system anomaly. HealthMonitor may then terminate and relaunch nodes accordingly. Exception 1030 is a class that captures internal failures. MathUtility 1040 provides enhanced handling of mathematical calculations and StringUtility 1050 provides enhanced handling of string operations.

Transform 1060 provides a class that provides a variety of utility functions and is related to ROS::tf and ROS:tf2. Here, tf is a package that lets the user keep track of multiple coordinate frames over time. tf maintains the relationship between coordinate frames in a tree structure buffered in time, and lets the user transform points, vectors, and so on, between any two coordinate frames at any desired point in time. Thus, transform 1060 provides similar features in the context of present embodiments.

In other aspects, such as real-time aspects, such as if it is a goal to stream robotic arm control commands or stream video/audio in real-time, it is possible to first reference IEEE time-sensitive network (TSN) definitions then implement the UDPServer, UDPClient, UDPSSLServer and UDPSSLClient. Typically, UDP is used here because it becomes possible to use UDP in applications where speed is more critical than reliability. For example, it may be better to use UDP in an application providing real-time interaction between robot 210 and user 230. Here, it is acceptable to lose some data points, as long as the goal of keeping interactions in real-time are satisfied.

If middleware is light enough to run on low-level boards such as STM32, then implement CANTransceiver. A Controller Area Network (CAN) bus is a robust bus standard designed to allow microcontrollers and devices to communicate with each other's applications without a host computer. It is a message-based protocol, designed originally for multiplex electrical wiring within automobiles to save on copper, but it can also be used in many other contexts. For each device, the data in a frame is transmitted sequentially but in such a way that if more than one device transmits at the same time, the highest priority device can continue while the others back off. Frames are received by all devices, including by the transmitting device.

Other goals may include using YAML (a recursive acronym for "YAML Ain't Markup Language"), which is a human-readable data-serialization language. YAML is commonly used for configuration files and in applications where data is being stored or transmitted. YAML targets many of the same communications applications as Extensive Markup Language (XML) but has a minimal syntax which intentionally differs from Standard Generalized Markup Language. For example, it may be possible to use YAML-cpp to implement a parameter server.

Also, the middleware may implement an asynchronous server/client pairing. Further, the middleware may implement a general state machine modality to replace ROS:: action. As yet another feature, the middleware may implement a node status visualizer. For such a visualizer, node status can be health, location, failures, mobility, or other information about the operation of a node that may be visualized in a helpful manner.

Figure 11:
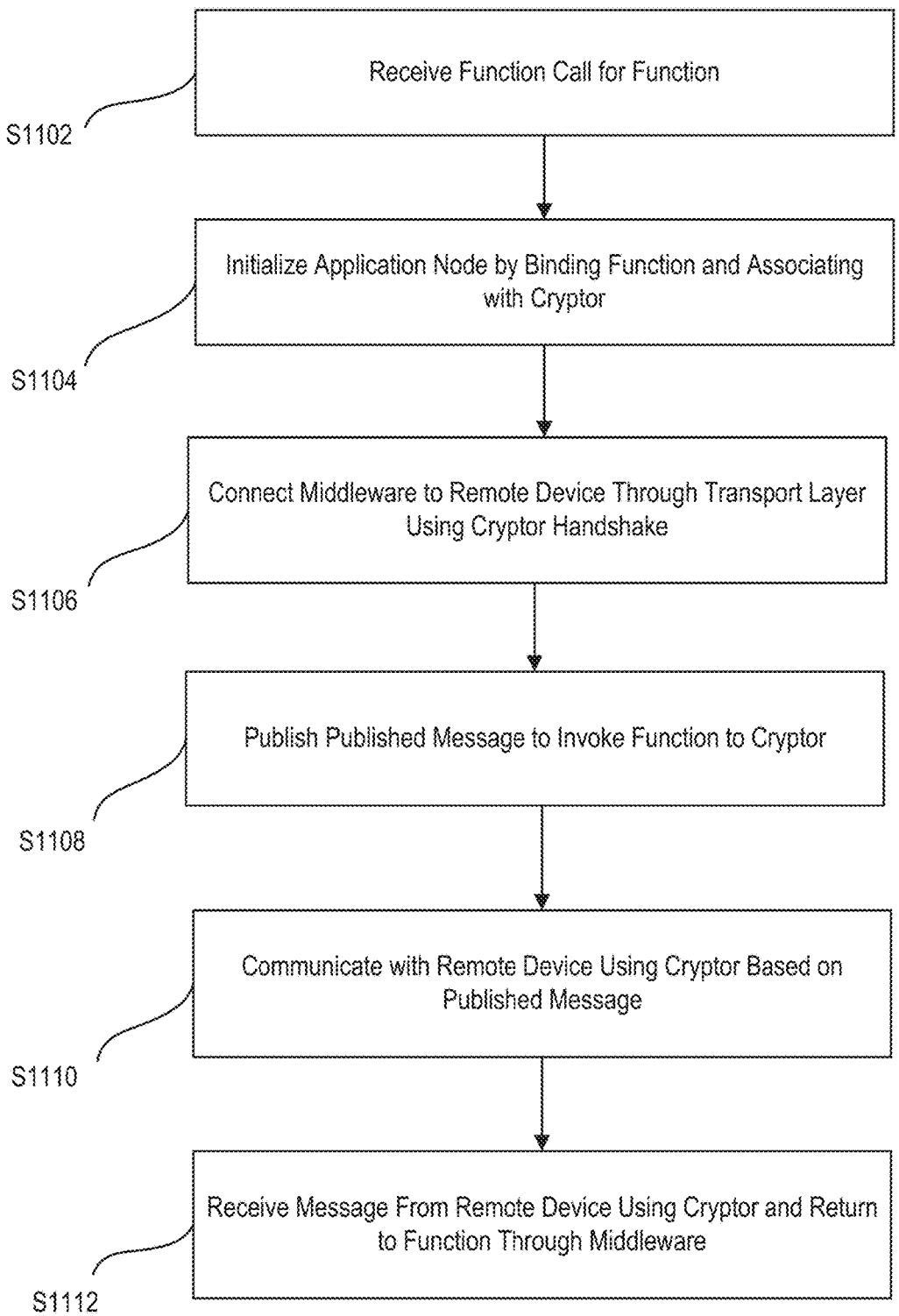
FIG. 11 illustrates a flowchart of an exemplary method for implementing a function for an application using a middleware on a computer, according to embodiments of the disclosure.

FIG. 11 illustrates a flowchart of an exemplary method 1100 for implementing a function for an application using a middleware on a computer, according to embodiments of the disclosure.

In step S1102, the method receives a function call for a function. For example, an application may wish to call an instruction to cause robot 210 to perform an action. For example, an application may wish to invoke a function such as NavigateRobot( ) to cause the robot 210 to move in a certain manner, ManipulateArm( ) to cause the robot 210 to move its arm, DetectObject( ) to cause the robot 210 to use sensors to detect an object, RecognizeHuman( ) to cause the robot 210 to recognize a human in its field of view, or Converse( ) to cause the robot 210 to carry out a conversation, such as by acting as a chatbot. However, these are only examples, and are not to be taken as limiting. The application may invoke other functions to be performed by the robot 210. The functions may also generate results that are returned to the application.

Before the application makes function calls, it is assumed that a class has been defined for the application, for example, robot navigation, robotic arm manipulation, object recognition, and so on. More details about the definition of a calls for the application are described, below, with respect to FIG. 15.

In step S1104, the method initializes an application node by binding a function and associating the function with a cryptor. The initializing is described in greater detail in connection with FIG. 15. In general, the initialing declares the application node using a NodeHandle 940 variable, binds the function, and establishes publisher relationships with the cryptor that prepares the application to define a way for the application and the remote device, such as robot 210, to communicate.

In step S1106, the method connects the middleware to a remote device through a transport layer using a cryptor handshake. As discussed above, each cryptor has a name associated with it, and the remote cryptor checks to see if the cryptor's name is registered. Once the remote cryptor confirms the registration, the handshake is successful, and the middleware is connected to the cryptor.

In step S1108, the method publishes a message, also referred to as a published message, to invoke a function to the cryptor. Once the application node has had the function bound to it and it is associated with the cryptor, the method publishes the published message to the cryptor. For example, using publisher and subscriber relationships, the middleware is able to convey the message to the cryptor.

In step S1110, the method communicates with the remote device using the cryptor based on the published message. Specifically, the cryptor automatically serializes the published message to produce a serialized message and sends the serialized messages through the transport layer, in response to the cryptor receiving the published message from the application node.

In step S1112, the method receives a message from the remote device using the cryptor and returns the message to the function through the middleware. This step S1112 may include receiving a remote message from the remote device through the transport layer using the cryptor and publishing the remote message through the middleware to be received by the function and the application node. The step S1112 may further include automatically deserializing the remote message to produce a deserialized message and sending the deserialized message through the middleware, in response to the cryptor receiving the remote message from the remote device through the transport layer.

Figure 12:
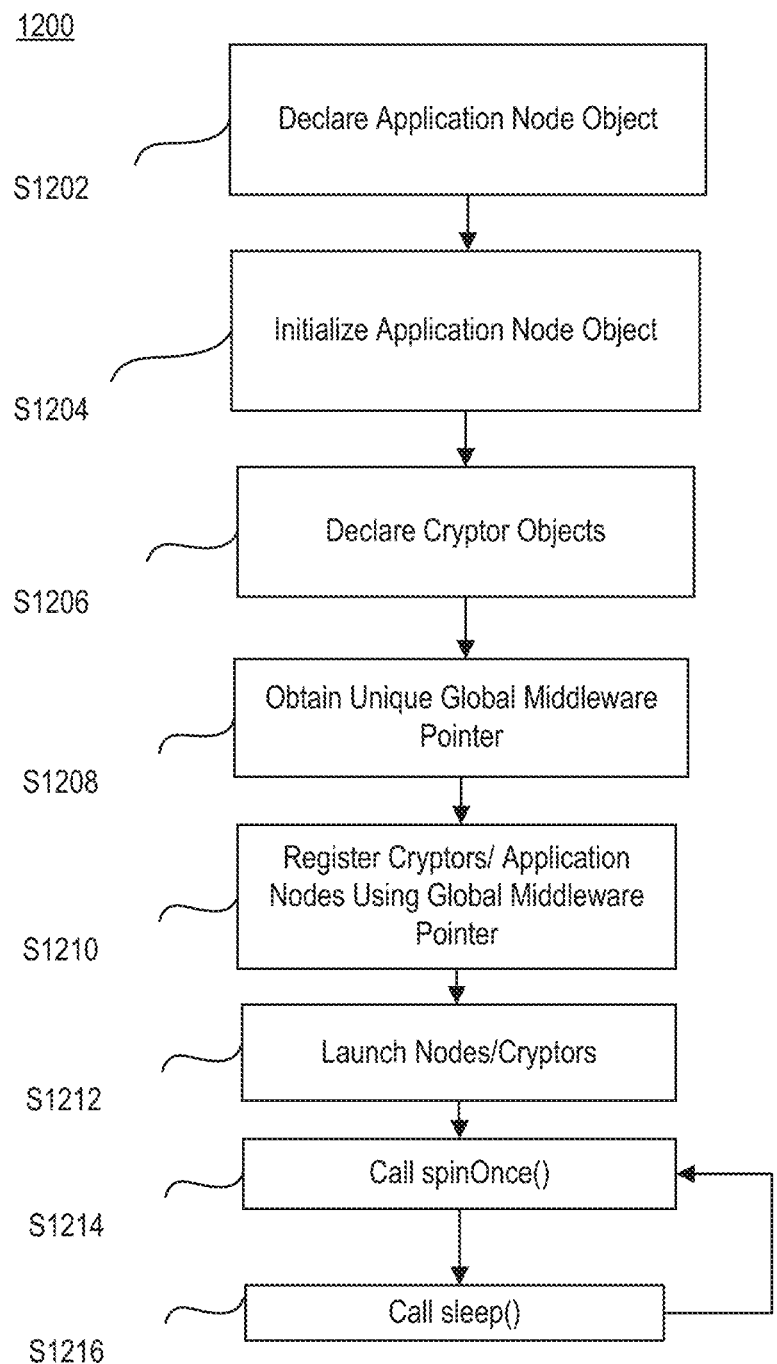
FIG. 12 illustrates a flowchart of an exemplary method for initializing and using a middleware, according to embodiments of the disclosure.

FIG. 12 illustrates a flowchart of an exemplary method 1200 for initializing and using a middleware, according to embodiments of the disclosure.

In step S1202, the method declares an application node object. As noted, this is performed by declaring a NodeHandle 940 variable, which is described further with respect to step S1502 in FIG. 15.

In step S1204, the method initializes the application node object. This is performed by binding functions, preparing publishers, and so on. It is described further with respect to steps S1504, S1506, and S1508 in FIG. 15.

In step S1206, the method declares cryptor objects. In general, this step involves initializing a transport layer, using the transport layer to construct a cryptor, and calling various aspects of cryptor, as also discussed in FIG. 7, above. S1206 is described further with respect to the method of FIG. 13, below.

In step S1208, the method obtains a unique global middleware pointer. For example, the method obtains the global Middleware 910 pointer by calling shared_ptr<Middleware> getMiddlewarePtr( ).

In step S1210, the method registers cryptors and application nodes using the global middleware pointer. For example, the method calls Middleware::registerNode(•••) to register every cryptor and application node. However, the registering does not apply to nodes that use a NodeHandle 940 variable because when NodeHandle::registerNode (•••) is called, the function automatically registers the node with the unique global middleware object.

In step S1212, the method launches nodes and cryptors. In order to perform such launching, the middleware invokes Middleware::launch(•••). Such launching spawns a thread with a default thread function to contain the application node.

In step S1214, the method calls spinOnce( ). Specifically, step S1214 invokes Middleware::spinOnce( ). As discussed above, spinOnce( ) traverses through every publisher and moves their published message to corresponding subscribers. Thus, the role of spinOnce( ) is to ensure that each time it is called, messages are propagated from publisher to subscriber in the middleware. Since the previous portions of the middleware have established the structure and paths these messages should follow, step S1214 ensures that messages are actually published and received successfully.

In step S1216, the method the method calls sleep( ), then loops back to step S1216, to perform more operations in an infinite while loop. Specifically, step S1216 invokes Middleware::sleep( ). As discussed above, sleep( ) manages ensuring that computation time is considered to yield a target rate. At this point, in the method, it is also possible to program certain nodes to dynamically shutdown or relaunch by calling Middleware::shutdown(•••) and Middleware::launch (•••), as needed.

Figure 13:
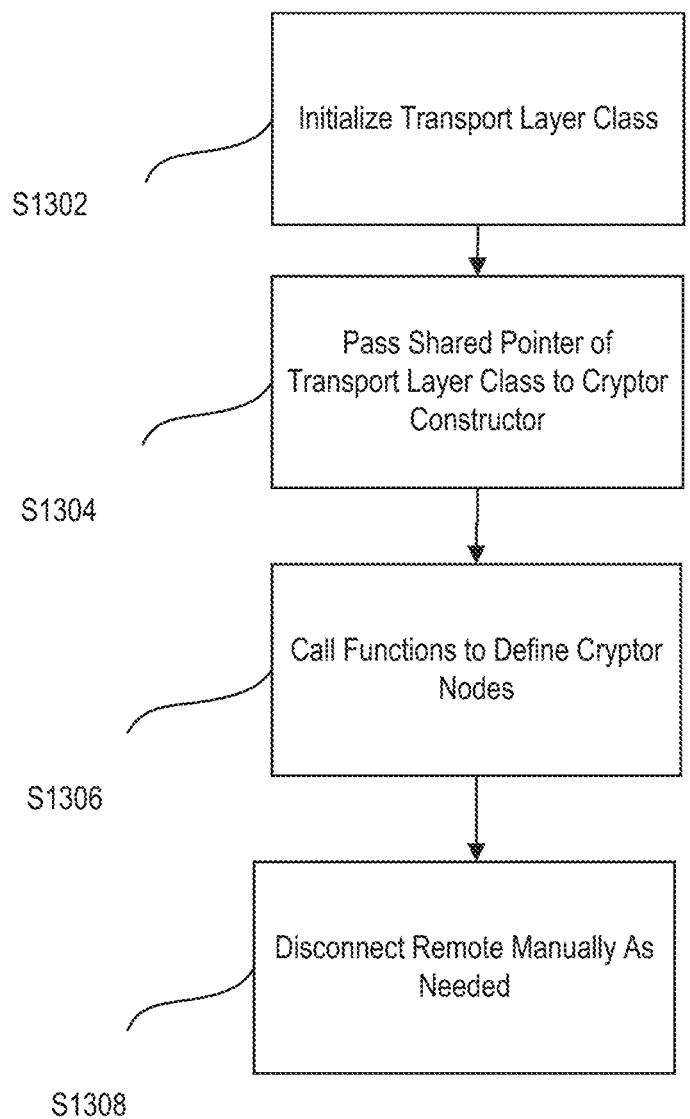
FIG. 13 illustrates a flowchart of an exemplary method for initializing and managing cryptors, according to embodiments of the disclosure.

FIG. 13 illustrates a flowchart of an exemplary method 1300 for initializing and managing cryptors, according to embodiments of the disclosure.

In step S1302, the method initializes a transport layer class. For example, initializing the transport layer class includes obtaining a shared pointer for the transport layer class.

In step S1304, the method passes a shared pointer of the transport layer class to the cryptor constructor. Such a shared pointer is used to construct the cryptor in the constructor call, thereby establishing an initial relationship between the cryptor and the transport layer.

In step S1306, the method calls functions to define cryptor nodes. For example, the method calls Cryptor::registerPlatforms(•••), Cryptor::subscribe(•••), Cryptor::advertise (•••), and Cryptor::setMiddlewareName(•••), accordingly.

In step S1308, the method disconnects the remote connection manually, as needed. For example, the method calls Cryptor::disconnect(•••), for a given cryptor.

Figure 14:
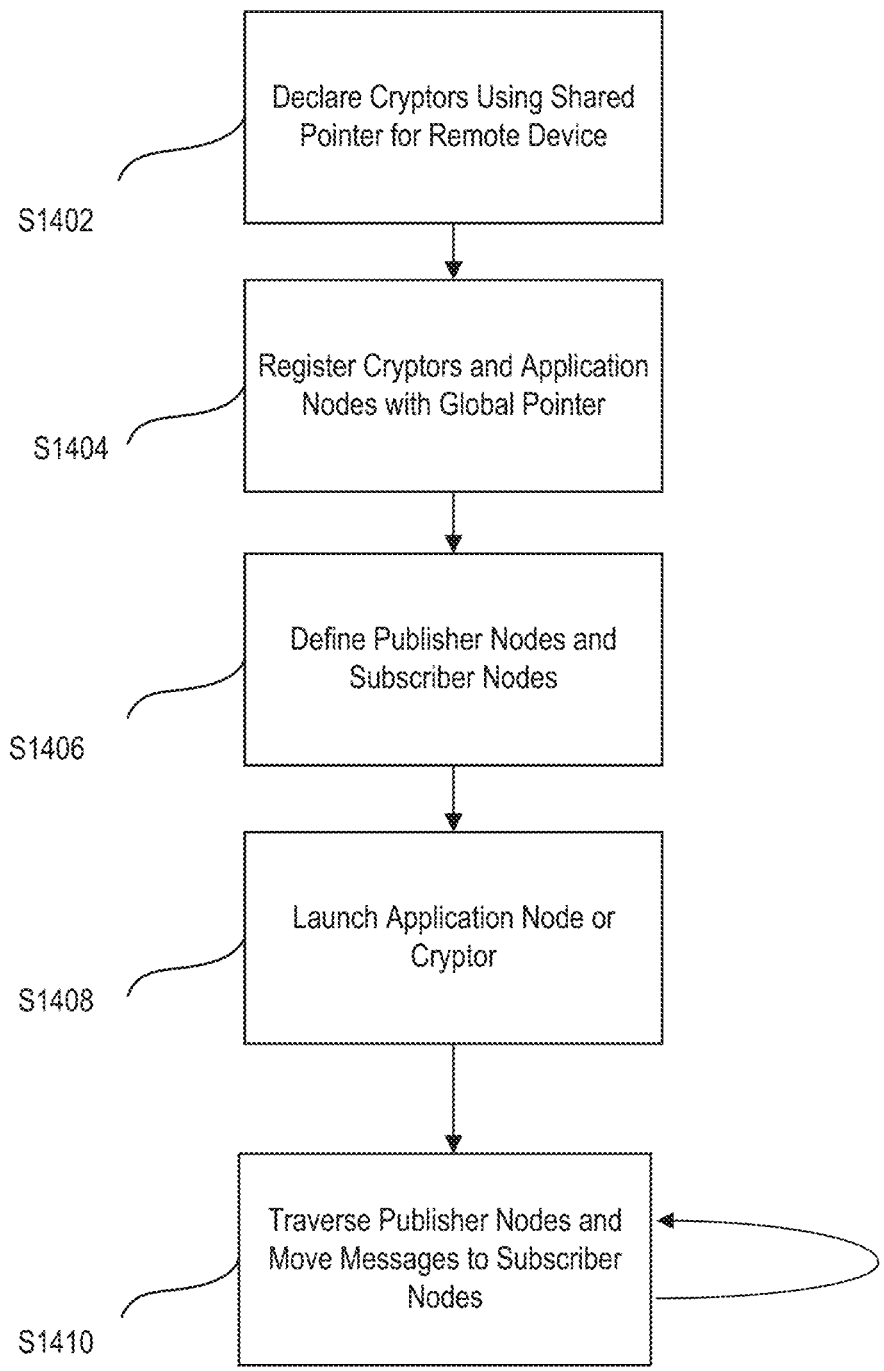
FIG. 14 illustrates a flowchart of another exemplary method for initializing and using a middleware, according to embodiments of the disclosure.

FIG. 14 illustrates a flowchart of another exemplary method 1400 for initializing and using a middleware, according to embodiments of the disclosure.

In step S1402, the method declares cryptors using a shared pointer for a remote device. As noted, step S1402 corresponds to FIG. 13.

In step S1404, the method registers cryptors and application nodes with the global pointer. Step S1404 corresponds to S1210.

In step S1406, the method defines publisher nodes and subscriber nodes. In step S1406, for example, nodes and cryptors can call subscribe(•••) and/or advertise(•••). The method can also define Publisher 850, SubscriberInner 830, PublisherInner 840, SubscriberCryptor 720, and PublisherCryptor 730 objects for use in sharing messages over the middleware.

In step S1408, the method launches an application node or a cryptor. Step S1408 corresponds to S1212.

In step S1410, the method traverses publisher nodes and moves the messages to the subscriber nodes. Step S1408 corresponds to S1214. In FIG. 14, it is also possible to perform a step corresponding to S1216, such that as the method moves messages from publisher nodes to subscriber nodes, the method includes a synchronizing step that helps the method maintain a certain operational rate.

FIG. 15 illustrates a flowchart of an exemplary method 1500 for initializing an application node, according to embodiments of the disclosure.

In step S1502, the method declares a NodeHandle 940 variable. As discussed above, prior to initializing an application node, the middleware defines a class for a specified application. The NodeHandle 940 variable may be declared as either public or private. The name and rate of the node variable are initialized by calling NodeHandle::Initialize(•••) as a constructor. By declaring a NodeHandle variable, it provides a way for an application to make application calls using an application programming interface (API) for the middleware, that allows a user 230 to invoke functions at the robot 210 remotely in a facilitated manner.

In step S1504, the method binds callback functions. The binding occurs by calling NodeHandle::subscribe(•••) for each callback function. By performing the binding, it allows the application to pass the callback function, facilitating providing the function call.

In step S1506, the method declares and initializes publishers. The method declares necessary Publisher 840 variables and calls NodeHandle::advertise(•••) to initialize them. By taking these steps, it prepares the middleware so that, when a message is ready to be published, it is possible to call Publisher::publish(•••) or Publisher::publishShallow(•••) accordingly.

In step S1508, the method optionally defines a process function that will be called at the same rate as the node, and calls NodeHandle::bindProcess(•••).

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for implementing a function for an application using a middleware on a computer, comprising:
receiving a function call for the function from the application for controlling a robot remote from the computer;
initializing an application node in the middleware corresponding to the application, the initializing comprising binding the function to the application node and associating the application node with a cryptor configured to provide secure message exchange with the robot;
connecting the middleware to the robot through a transport layer using the cryptor;
publishing a message to invoke the function from the application node, through the middleware, to the cryptor; and
communicating with the robot using the cryptor, based on the published message; and
invoking the function remotely at the robot to cause the robot to perform an action,
wherein the robot includes a remote middleware using a remote cryptor, wherein the communicating with the robot using the cryptor further comprises performing a handshake between the cryptor of the computer and the remote cryptor of the robot by exchanging middleware names of the middleware and the remote middleware and comparing the received remote middleware name to middleware names locally registered on the computer.

2. The method of claim 1, wherein the binding the function comprises establishing one or more subscriber or publisher relationships between the function and the application node.

3. The method of claim 1, wherein the method further comprises automatically serializing the published message to produce a serialized message and sending the serialized message through the transport layer, in response to the cryptor receiving the published message from the application node.

4. The method of claim 1, further comprising receiving a remote message from the robot through the transport layer using the cryptor and publishing the remote message through the middleware to be received by the function at the application node,
wherein the method further comprises automatically deserializing the remote message to produce a deserialized message and sending the deserialized message through the middleware, in response to the cryptor receiving the remote message from the robot through the transport layer.

5. The method of claim 1, wherein the middleware comprises at least one additional application node and at least one additional cryptor and the method further comprises exchanging published messages between the additional application node and the additional cryptor through the middleware to implement functions for the additional application node,
wherein each published message has an associated message type, and each published message is exchanged between an application node and a cryptor in the middleware based on the associated message type.

6. The method of claim 1, wherein the function includes an initialize function, wherein the initializing an application node in the middleware corresponding to the application further comprises:
calling a function pointer associated with the initialization function after the application node is launched to complete the initializing,
wherein the function pointer enables a user of the robot to access information associated with the computer.

7. The method of claim 1, further comprising:
binding a terminate function to the application node;
calling a function pointer associated with the terminate function; and
shutting down the application node in the middleware corresponding to the application using the function pointer,
wherein the function pointer enables a user of the robot to close data or release memory at the computer.

8. The method of claim 1, further comprising:
binding a process function to the application node;
calling a function pointer associated with the process function at a rate equal to a rate of the application node to which the function is bound after all subscribers' callbacks are called; and
enabling a user of the robot to process information based on the function pointer and a subscriber message.

9. The method of claim 1, wherein invoking the function remotely at the robot to cause the robot to perform an action further comprises at least one of:
invoking a navigate robot function to cause the robot to move;
invoking a manipulate arm function to cause the robot to move a robotic arm;
invoking a detect object function to cause the robot to use sensors to detect an object;
invoking a recognize human function to cause the robot to recognize a human in its field of view; or
invoking a converse function to cause the robot to carry out a conversation.

10. A system for implementing a function for an application using a middleware on a computer, comprising:
at least one processor; and
a memory storing instructions that, when executed by the at least one processor, cause the processor to:
receive a function call for the function from the application for controlling a robot remote from the computer;
initialize an application node in the middleware corresponding to the application by binding the function to the application node and associating the application node with a cryptor configured to provide secure message exchange with the robot;
connect the middleware to the robot through a transport layer using the cryptor;
publish a message to invoke the function from the application node, through the middleware, to the cryptor;
communicate with the robot using the cryptor, based on the published message; and
invoke the function remotely at the robot to cause the robot to perform an action,
wherein the robot includes a remote middleware using a remote cryptor, wherein to communicate with the robot using the cryptor, the at least one processor is further configured to perform a handshake between the cryptor of the computer and the remote cryptor of the robot by exchanging middleware names of the middleware and the remote middleware and comparing the received remote middleware name to middleware names locally registered on the computer.

11. The system of claim 10, wherein binding the function to the application node further comprises establishing one or more subscriber or publisher relationships between the function and the application node.

12. The system of claim 10, wherein the at least one processor is further configured to automatically serialize the published message to produce a serialized message and send the serialized message through the transport layer, in response to the cryptor receiving the published message from the application node.

13. The system of claim 10, wherein the at least one processor is further configured to receive a remote message from the robot through the transport layer using the cryptor and publish the remote message through the middleware to be received by the function at the application node, wherein the at least one processor is further configured to automatically deserialize the remote message to produce a deserialized message and send the deserialized message through the middleware, in response to the cryptor receiving the remote message from the robot through the transport layer.

14. The system of claim 10, wherein the middleware comprises at least one additional application node and at least one additional cryptor, and the at least one processor is further configured to exchange published messages between the additional application node and the additional cryptor through the middleware to implement functions for the additional application node.

15. The system of claim 14, wherein each published message has an associated message type, and each published message is exchanged between an application node and a cryptor in the middleware based on the associated message type.

16. The system of claim 10, wherein to invoke the function remotely at the robot to cause the robot to perform an action, the at least one processor is further configured to:
invoke a navigate robot function to cause the robot to move;
invoke a manipulate arm function to cause the robot to move a robotic arm;
invoke a detect object function to cause the robot to use sensors to detect an object;
invoke a recognize human function to cause the robot to recognize a human in its field of view; or
invoke a converse function to cause the robot to carry out a conversation.

17. A non-transitory computer-readable medium storing instructions that, when executed by at least one processor, cause the at least one processor to perform a method for implementing a function for an application using a middleware on a computer, the method comprising:
receiving a function call for the function from the application for controlling a robot remote from the computer;
initializing an application node in the middleware corresponding to the application, the initializing comprising binding the function to the application node and associating the application node with a cryptor configured to provide secure message exchange with the robot;
connecting the middleware to the robot through a transport layer using the cryptor;
publishing a message to invoke the function from the application node, through the middleware, to the cryptor;
communicating with the robot using the cryptor, based on the published message; and
invoking the function remotely at the robot to cause the robot to perform an action,
wherein the robot includes a remote middleware using a remote cryptor, wherein the communicating with the robot using the cryptor further comprises performing a handshake between the cryptor of the computer and the remote cryptor of the robot by exchanging middleware names of the middleware and the remote middleware and comparing the received remote middleware name to middleware names locally registered on the computer.

18. The non-transitory computer-readable medium of claim 17, wherein the method further comprises receiving a function call for the function from the application and wherein the publishing the message to invoke the function to the cryptor, through the middleware, is performed in response to receiving the function call.

* * * * *